US006671013B1

(12) United States Patent
Ohkawa

(10) Patent No.: US 6,671,013 B1
(45) Date of Patent: Dec. 30, 2003

(54) OPTICAL WAVEGUIDE SHEET HAVING PROJECTIONS WITH TWO REFLECTION FACES AND A RIDGE, SURFACE ILLUMINANT DEVICE AND LIQUID CRYSTAL DISPLAY

(75) Inventor: Shingo Ohkawa, Koshigaya (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/647,760

(22) PCT Filed: Feb. 16, 2000

(86) PCT No.: PCT/JP00/00871

§ 371 (c)(1),
(2), (4) Date: Oct. 5, 2000

(87) PCT Pub. No.: WO00/49432

PCT Pub. Date: Aug. 24, 2000

(30) Foreign Application Priority Data

Feb. 17, 1999 (JP) .............................................. 11-038977

(51) Int. Cl.[7] .............................................. G02F 1/1335
(52) U.S. Cl. .............................. 349/62; 349/63; 349/65; 362/31
(58) Field of Search .............................. 349/62, 63, 65; 362/31

(56) References Cited

U.S. PATENT DOCUMENTS 5,961,198 A   10/1999  Hira et al.
6,088,074 A * 7/2000  Suzuki ......................... 349/62
6,099,134 A * 8/2000  Taniguchi et al. ............. 362/31
6,330,386 B1 * 12/2001 Wagner et al. ............... 385/120

FOREIGN PATENT DOCUMENTS

| CN | 259861 | 10/1995 |
| CN | 278142 | 6/1996 |
| EP | 0878720 A1 | 11/1998 |
| JP | 05-127157 | 5/1993 |
| JP | 9-269489 | 10/1997 |
| WO | WO 98/27382 | * 6/1998 |

* cited by examiner

Primary Examiner—Robert H. Kim
Assistant Examiner—Andrew Schechter

(57) ABSTRACT

A light guide plate provides an emission controlled in three dimensions with little light leaking, being applied to a surface light source device and LCD. The back face is provided with projections each having a pair of faces providing a guiding portion. Orientation of the projections are aligned to a main light coming direction. Input light input to a valley configured as to get narrower and shallower according to distance from the guide portion, then being inside reflected as two slopes successively. Three-dimensionally direction-converted twice, inside output light directed to the emission face is generated. A direction of the output light is controlled through adjusting inclination angles of the slopes. Light introduction from two directions opposite to each other may be done so that the guiding portions are used for direction conversion.

9 Claims, 14 Drawing Sheets

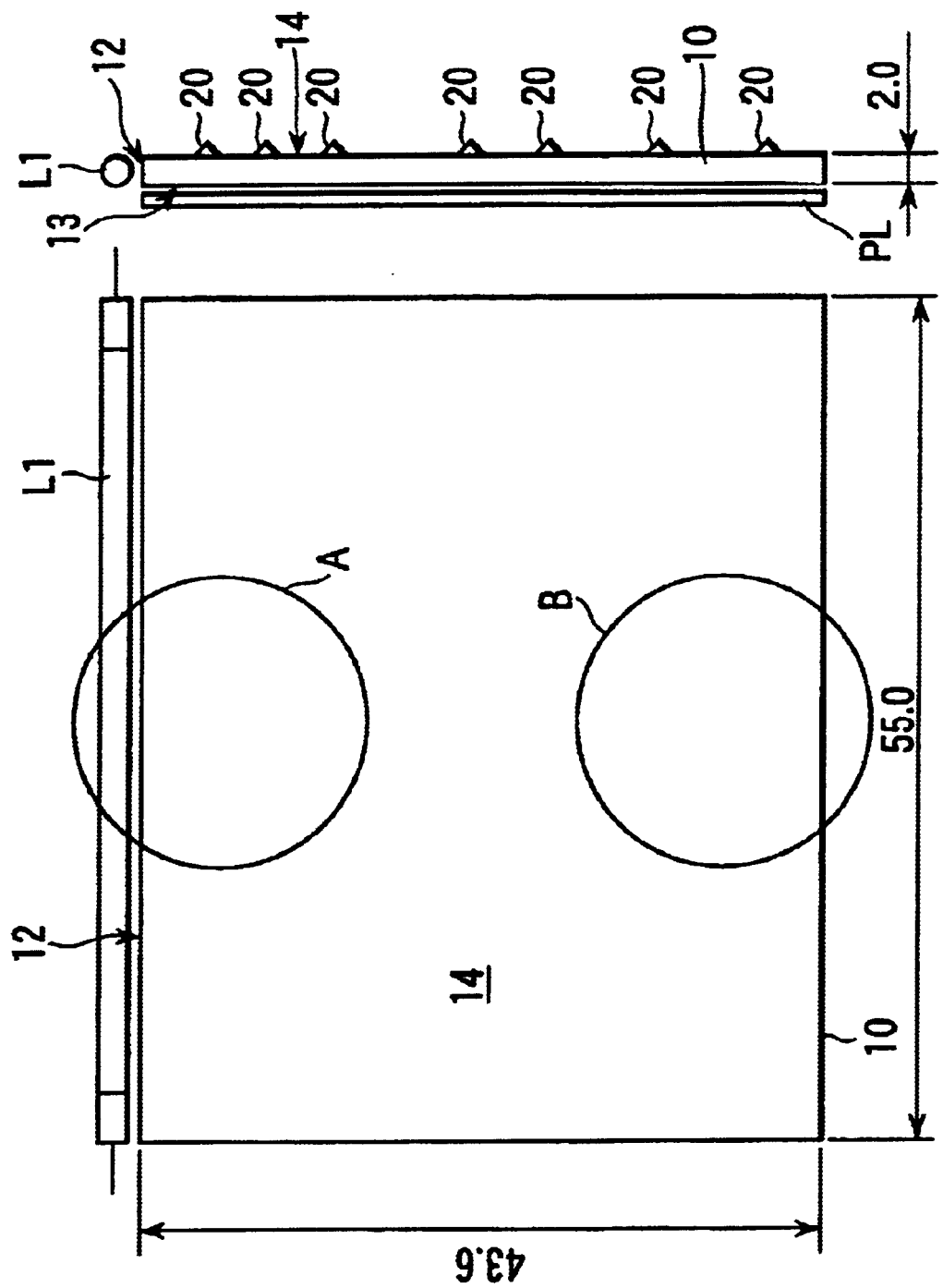

A-ENLARGED

B-ENLARGED

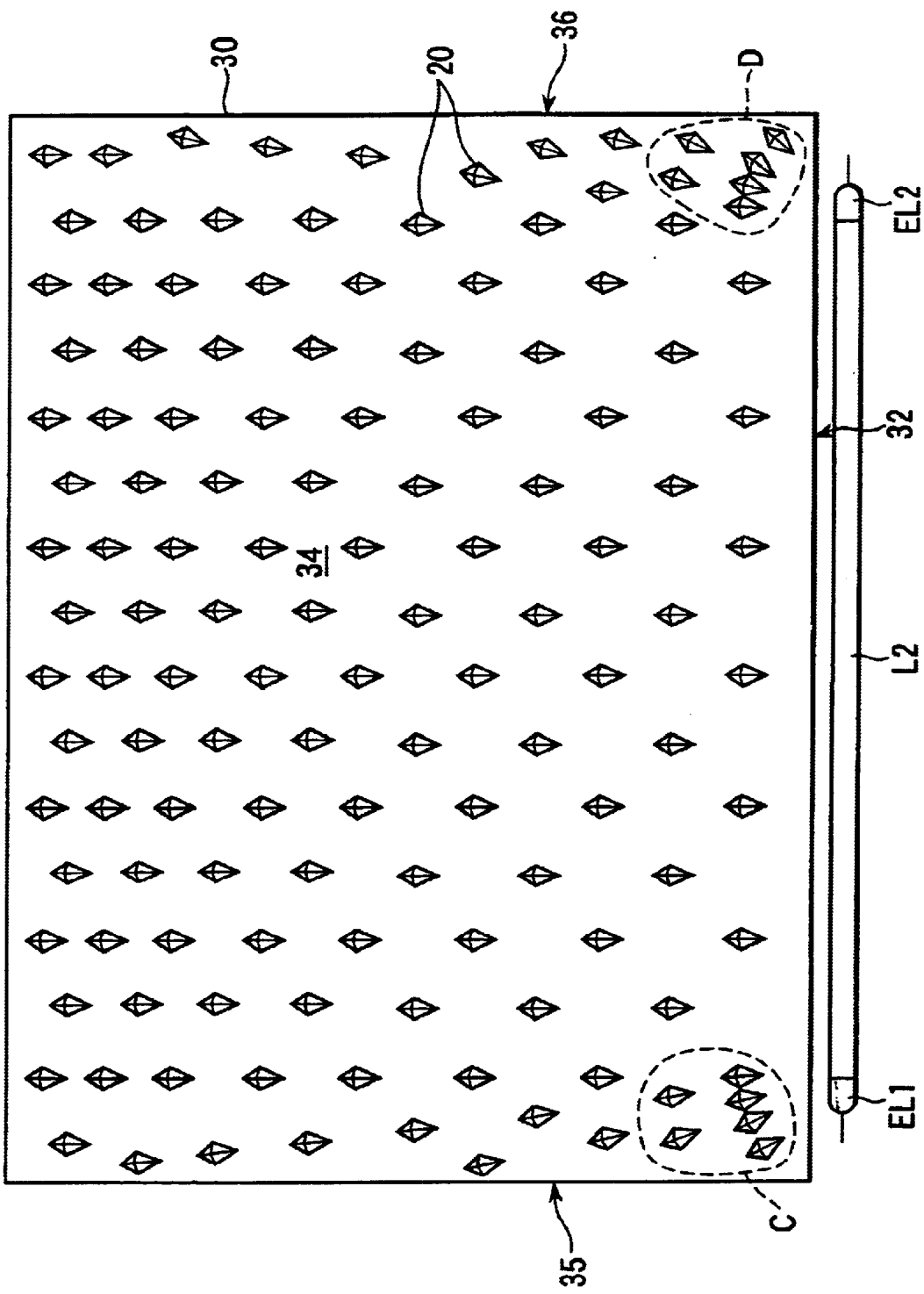

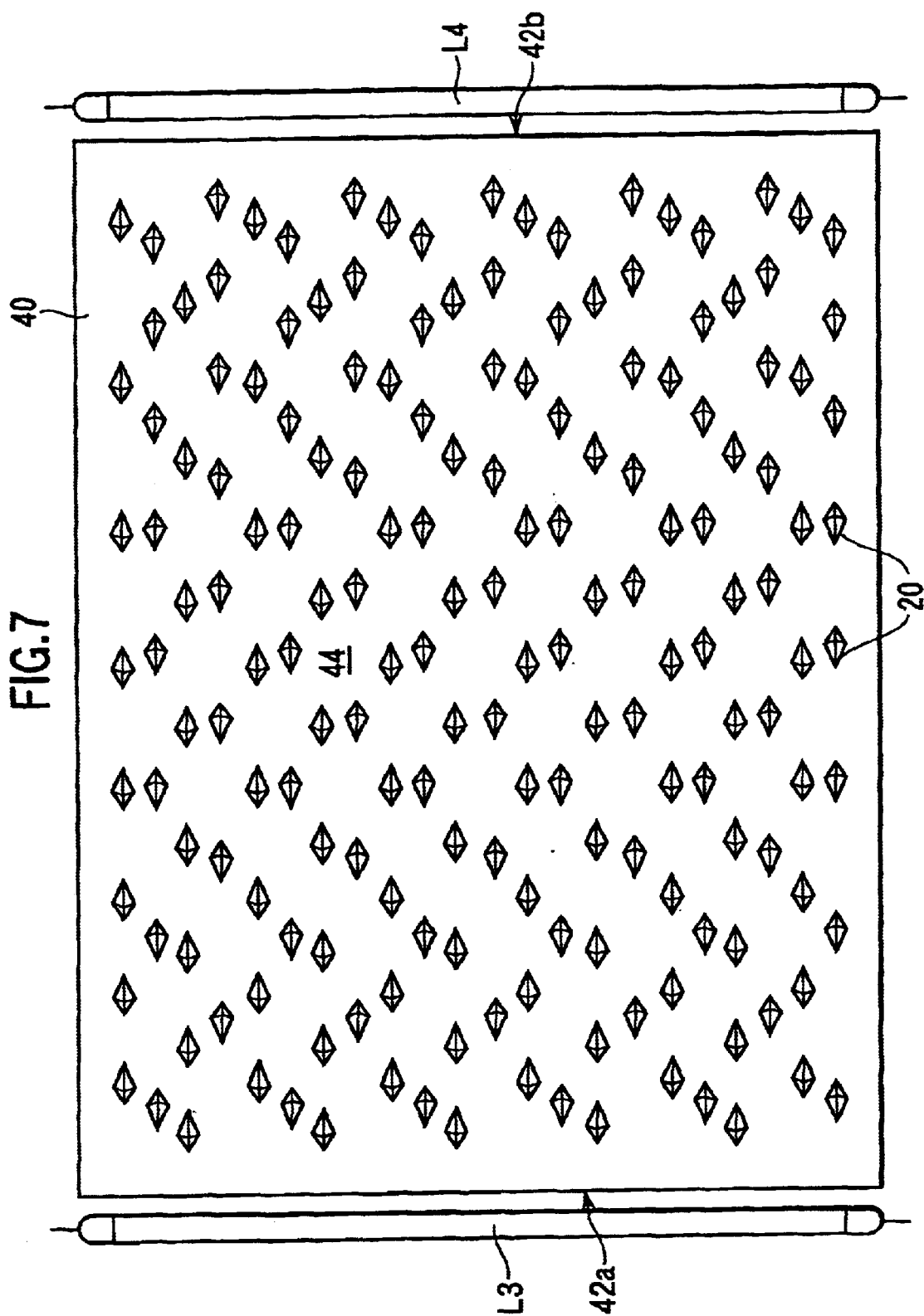

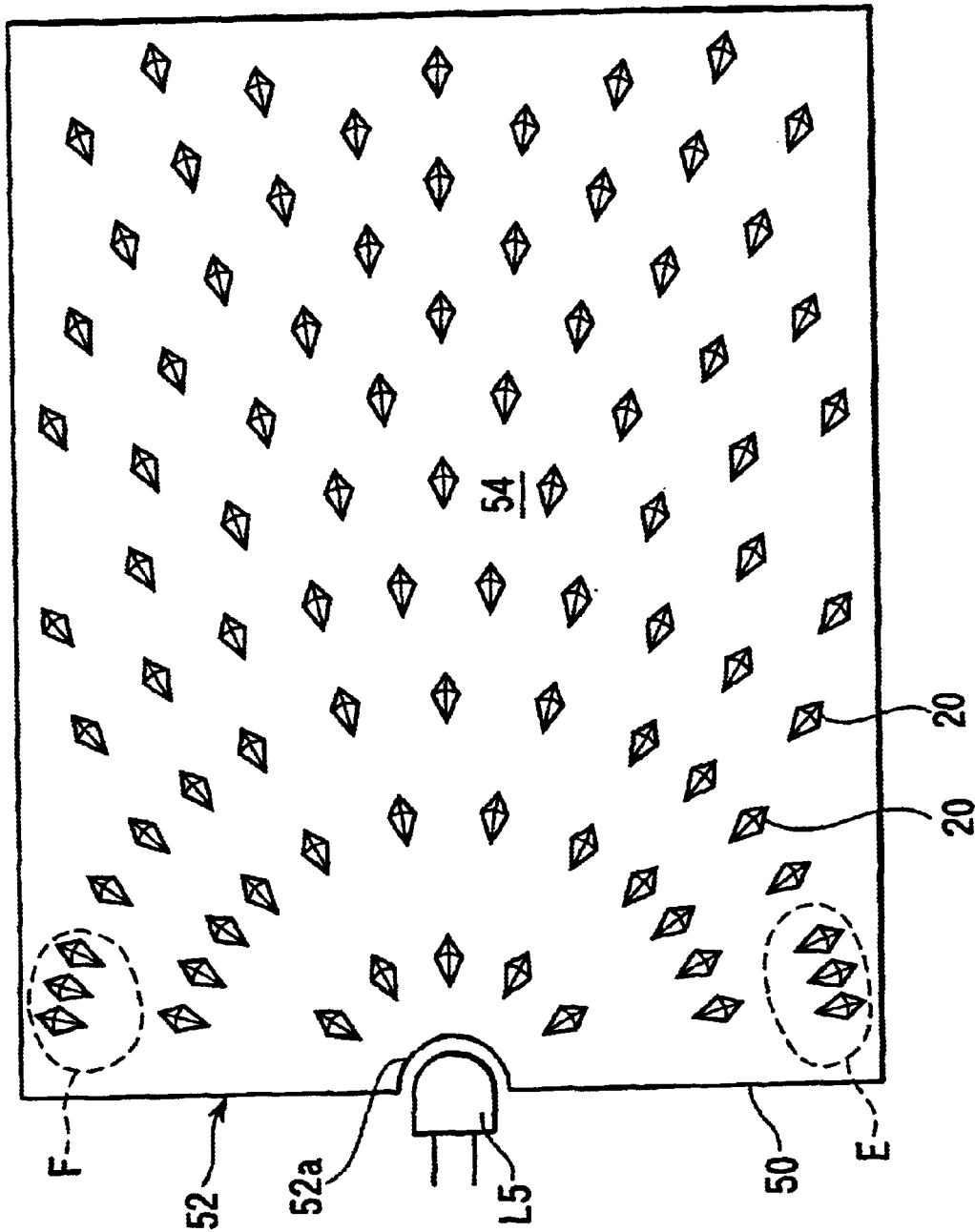

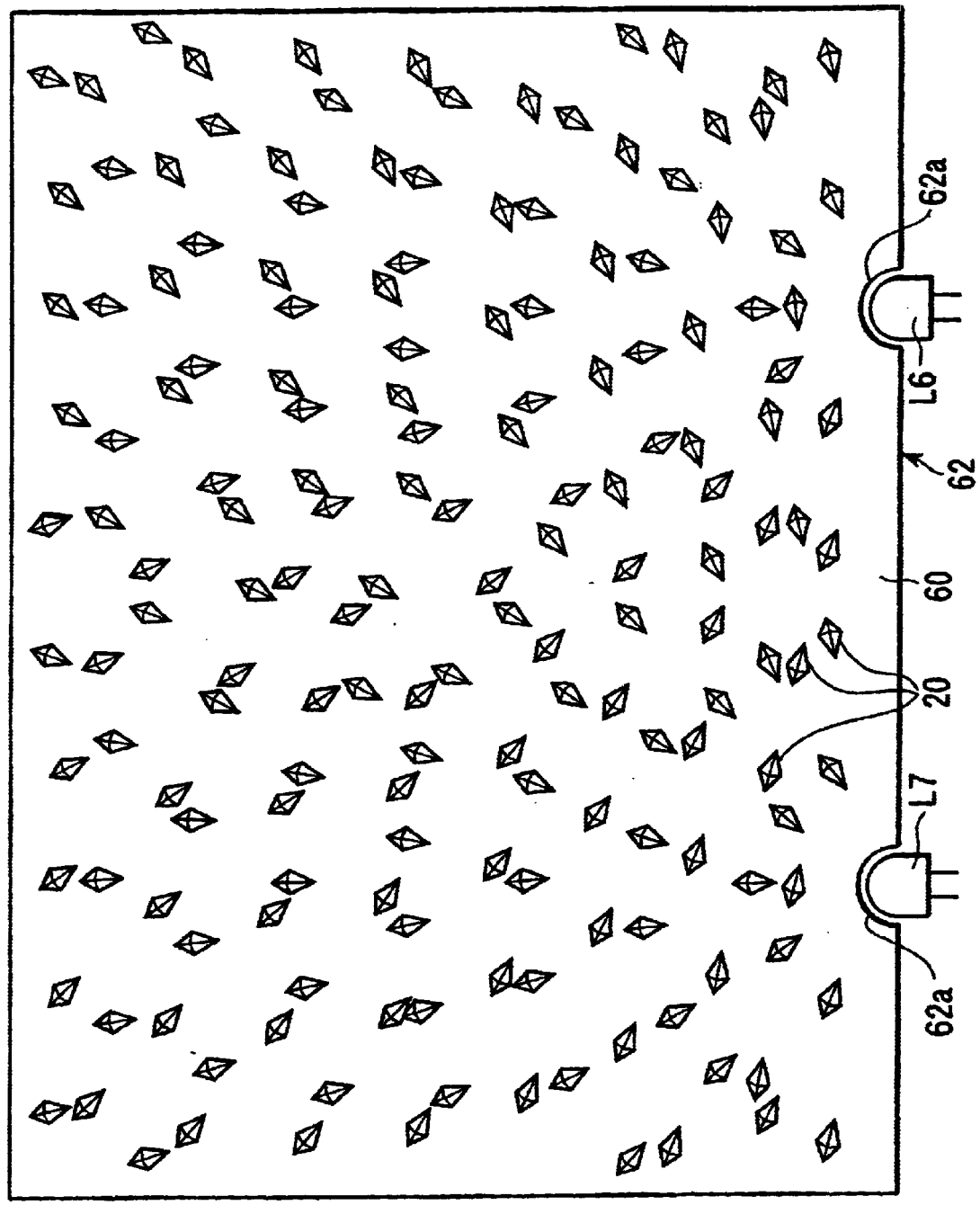

OPTICAL WAVEGUIDE SHEET HAVING PROJECTIONS WITH TWO REFLECTION FACES AND A RIDGE, SURFACE ILLUMINANT DEVICE AND LIQUID CRYSTAL DISPLAY

FIELD OF INVENTION

The present invention relates to a light guide plate which is supplied with light sideways and deflects the light to output from an emission face, further relating to a surface light source device employing the light guide plate as well as to a liquid crystal display employing the surface light source device for back-lighting or front-lighting.

BACKGROUND

A surface light source device of a type comprises a light guide plate having an end face, through which light is introduced, and two major faces (i.e. faces larger than end faces) one of which provides an emission face, being employed for various uses such as back-lighting or front-lighting for a liquid crystal display. Basic performance of surface light source devices of such type greatly depends on light guide plates employed therein.

A basic function of a light guide plate is to change propagation direction (roughly in parallel with an emission face of the light guide plate) of light introduced into the light guide plate through a side end face so that the light is emitted through the emission face. As known well, a simply transparent light guide plate without any modification is capable of deflecting light slightly, providing unsatisfactory brightness. Consequently, any means for promoting emission through the emission face is required.

Means for promoting emission from a light guide plate relies upon one of the followings or some of them as combined.

(1) Scattering power within the light guide plate (light scattering guide plate);
(2) Emission face (a major face) provided with light diffusibility;
(3) Back face provided with light diffusibility;
(4) Emission face provided with light-refractive unevenness;
(5) Back face provided with light-refractive unevenness.

Ways based on (1) provide uniform and highly effective emission with ease. However, the emission is subject to have a preferential direction much inclined with respect to a frontal direction. (Usually, inclination is about 60 to 75 degrees to a normal with respect to the emission face.) Accordingly, an element (prism sheet) for modifying the inclined direction to the frontal direction must be arranged. Although employment of a light diffusion sheet brings some increase in frontal emission, it involves a wide light diffusion which leads to reduction in light energy efficiency.

Ways based on (2) or (3) hardly provide uniform and effective emission. The emission is also preferentially directed to oblique directions as in the case of (1). Increase of light diffusibility checks the efficiency because of factors such as wide range scattering or absorption by light scattering elements (e.g. white ink).

Ways based on (4) are capable of causing light to escape from the emission face with ease while positive direction conversions are less effected. Accordingly, emission with high efficiency is expected little. In particular, it is not advantageous that they fail to generate light which travels from the back face to the emission face.

Ways based on (5) positively generate light which travels from a back face to an emission face of a light guide plate, being free from wide range light scattering. Accordingly, the ways are latently capable of effectively generating emission directed to approximately frontal directions. However, in practice, prior arts fail to control propagating direction of emission sufficiently.

FIG. 1a to FIG. 1c illustrate examples employing the above (5). Referring to the figure, reference number 1 indicates a light guide plate made of a transparent material such as acrylic resin, the plate having a side end face to provide an incidence face 2. A primary light source L is disposed beside the incidence face 2 to be supplied with light from the primary light source L. One of two major faces 3, 4 of the light guide plate 1 provides an emission face 3. The other major face (called "back face") is provided with a great number of recesses 5 with slopes 5a, 5b in profile.

Light emitted from the primary light source L is introduced into the light guide plate 1 through the incidence face 2. Upon encountering a recess, propagation light within the light guide plate 1 (as represented by $G_1$, $G_2$) is inner-reflected by one slopes 5a to be directed to the emission face 3. Inner-incidence angle is denoted by $\theta$ and emission derived from beams $G_1$, $G_2$ is denoted by $G_1'$, $G_2'$. In other words, the slope 5a, which is relatively near to the incidence face 2 (or primary light source L) compared with the other slope 5b, provides an inner-reflection slope for direction conversion. This effect is sometimes called edge-lighting effect.

The recesses 5 are formed like dots or linear channels. As shown in FIG. 1a to FIG. 1c, formation pitch d, depth h or slope inclination $\phi$ of the recesses 5 is varied depending on distance from the incidence face 2. Such variations prevent brightness on the emission face 3 from varying depending on distance from the incidence face 2.

However, prior arts as shown in FIG. 1a to FIG. 1c are subject to the following problems.

1. Light is hard to reach a region behind the slope 5b as viewed from the incidence face 2. Therefore, reduction of formation pitch d hardly rises direction conversion efficiency and the emission face 3 is apt to show unevenness in brightness.

2. Sufficient direction control in a plane parallel to the incidence face 2 is not effected. For instance, if beams G1, G2 are parallel to the emission face 3 but not perpendicular to the incidence face 2, emission beams G1', G2' will be diverged to the right or left as viewed from the incidence face 2. Actually, there is considerable light component propagating not perpendicularly with respect to the incidence face 2 within the light guide plate 1. Accordingly, it is difficult to direct emission to a desirable angle or within a desirable angle range spatially (i.e. in both planes parallel and vertical to the incidence face 2).

3. Light is apt to leak through the back face 4 because direction conversion for generating light directed to the emission face 3 relies upon once-reflection (at slope 5a). That is, condition for total reflection is broken with ease at reflection for direction conversion. For instance, if beams G1', G2' are required to be directed to approximately frontal directions, inner-incidence angle $\theta$ is set at about 45 degrees. This is roughly the same as the critical angle for interface between air and acrylic resin which is a typical material. Therefore, a considerable part of light propagating slightly downward leaks through the slope 5a.

OBJECT AND SUMMARY OF INVENTION

The present invention aims to solve the above problems of prior arts. That is, an object of the present invention is to improve a light guide plate, which introduces light through a side end face (incidence face) to emit light through an emission face, so that the plate has no region which light is hard to reach and emission direction is controllable both in plane parallel and vertical to an incidence face while light leaking through a back face scarcely occurs.

Another object of the present invention is to provide, by using the improved light guide plate, a surface light source device capable of effectively generating illumination light emission direction of which is controlled both in plane parallel and vertical to an incidence face with no direction modifying element such as prism sheet being employed.

Still another object of the present invention is to provide, by applying the above surface light source device to a back-lighting or front-lighting arrangement, a liquid crystal display which is easy to view from a desired direction.

The present invention achieves the above objects under a basic idea that direction conversion is effected by twice-inner-reflection at inner surfaces of a projection.

First, the present invention improves a light guide plate comprising two major faces to provide an emission face and a back face, and a side end face to introduce light.

According to a feature of the present invention, the back face of the light guide plate is provided with a great number of projections for conversion of light propagation direction and each of the projections includes a guide portion and a conversion output portion having a ridge on both sides of which a first reflection face and a second reflection face are formed.

The ridge, and the first and second reflection faces configurate a valley within each projection, the valley getting narrower and shallower according to distance from the guide portion.

This causes inner input light reaching the valley to be reflected by one of said first and second reflection faces and then reflected by the other reflection face so that inner output light directed to the emission face can be generated.

The ridges of the conversion output portions of the projections may run in directions distributed depending on positions on the back face. In this case, distribution of emission directions from the emission face can be controlled depending on distribution of running directions of the ridges.

The present invention provides an improved surface light source device employing the above light guide plate. The present invention improves a surface light source device comprising at least one primary light source and a light guide plate having two major faces to provide an emission face and a back face and having a side end face to introduce light emitted from the primary light source.

Corresponding to the above feature of the light guide plate, the back face is provided with a great number of projections for conversion of light propagation direction. Each of the projections includes a guide portion and a conversion output portion including a first ridge on both sides of which a first reflection face and a second reflection face are formed.

The first ridge, and the first and second reflection faces configurate a first valley within each of the projections. The first valley is getting narrower and shallower according to distance from the guide portion.

This causes inner input light reaching the first valley to be reflected by one of the first and second reflection faces and then reflected by the other reflection face so that inner output light directed to the emission face can be generated.

Running direction of the first ridge may vary depending on position on the back face. In this case, distribution of emission directions from the emission face can be controlled depending on distribution of running directions of the first ridges.

According to an embodiment, inner output light produced by the numerous projections is emitted from the emission face so as to be directed roughly parallel to a normal with respect to the emission face. And according to another embodiment, inner output light produced by the numerous projections is emitted from the emission face so as to form a convergent flux.

Light introduction may be done from a first direction and a second direction opposite to the first direction. In this case, the guide portion may have a valley-like configuration the same as or similar to that of the conversion output portion, with the conversion output portion also functioning like the guide portion.

To achieve this, the guide portion is also configurated like a valley so that light guiding function and conversion outputting function are exchanged with each other for the light introduced from the second direction, while the light introduced from the first direction gives inner input light which reaches the first valley via the guide portion to be reflected by one of the first and second reflection faces and then by the other reflection face so that inner output light directed to the emission face can be generated.

That is, the guide portion includes a second ridge on both sides of which a third reflection face and a fourth reflection face are formed, while the second ridge, the third reflection face and the fourth reflection face configurate a second valley within each of the projections, the second valley getting narrower and shallower according to distance from the conversion output portion.

This causes inner input light reaching the second valley via the conversion output portion after being introduced from the first direction to be reflected by one of the third and fourth reflection faces and then by the other reflection face so that inner output light directed to the emission face can be generated. The first and second valleys are preferably approximately the same dimension and approximately the same configuration.

Surface light source devices improved as above may be applied to back-lighting-type and front-lighting-type liquid crystal displays for illuminating their liquid crystal display panels from the back side or front side (viewing side). In those cases, the liquid crystal displays reflect characteristics of the surface light source devices. Consequently, a liquid crystal display in accordance with the present invention provides a bright display screen as viewed from a certain direction or position.

BRIEF DESCRIPTION OF DRAWINGS

FIGS. 2a and 2b illustrate the outline of a first embodiment in accordance with the present invention, FIG. 1a being a plan view from the back face side of the light guide plate, FIG. 1b being a side view from the left side in FIG. 1a;

FIGS. 3a and 3b illustrate the arrangement of the projection 20 in the first embodiment, FIG. 3a being an enlarged illustration of a circled part A in FIG. 2a, and FIG. 3b being an illustration of projection arrangement in a circled part B in FIG. 2a;

FIG. 6 is a plan view to illustrate projection arrangement in a second embodiment in accordance with the present invention;

FIG. 7 is a plan view to illustrate projection arrangement in a third embodiment in accordance with the present invention;

FIG. 8 is a plan view to illustrate projection arrangement in a fourth embodiment in accordance with the present invention;

FIG. 9 is a plan view to illustrate projection arrangement in a fifth embodiment in accordance with the present invention;

MOST PREFERRED EMBODIMENTS (1) First Embodiment

Figure 1A:
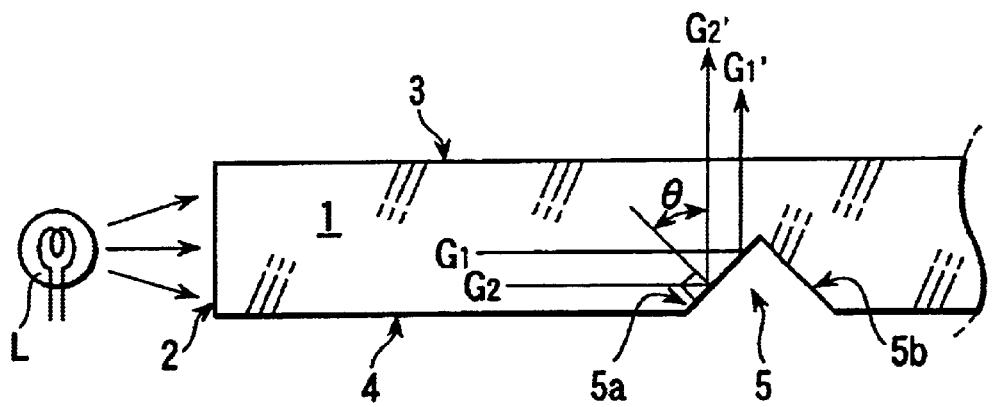
FIGS. 1a to 1c illustrate prior arts, FIG. 1a illustrating principle of edge-lighting, FIGS. 1b and 1c illustrating arrangements of recesses.

FIGS. 2a and 2b illustrate an outline of the first embodiment in accordance with the present invention. FIG. 2a is a plan view from the back face side of the light guide plate and FIG. 2b is a side view from the left side in FIG. 1a.

Referring to FIGS. 2a and 2b, a light guide plate 10 made of a transparent material such as acrylic resin or polycarbonate (PC) has a side end face to provide an incidence face 12. A rod-like primary light source (cold cathode tube) L1 is disposed along the incidence face 12 which is supplied with light from the light source. One of major faces 13,14 of the light guide plate 10 provides an emission face. The other major face (back face) 14 is provided with a great number of projections 20.

A well-known liquid crystal display panel PL is disposed on the outside of the emission face 13 to provide a backlight-type liquid crystal display. Note that data of dimensions in mm are merely examples.

The primary light source L1 emits light, which is introduced into the light guide plate 10 through the incidence face 12. When light gets into a projection 20 on the way of propagation within the plate 10, the projection 20 effects mainly twice-reflection therein to generate light which is directed to the emission face 13. In a different way of saying, "input light to projections 20 is converted into inner output light directed to the emission face 13", because the projections 20 provide direction conversion means. Configuration and operation of individual projection 20 are described in details later.

Figure 3A:
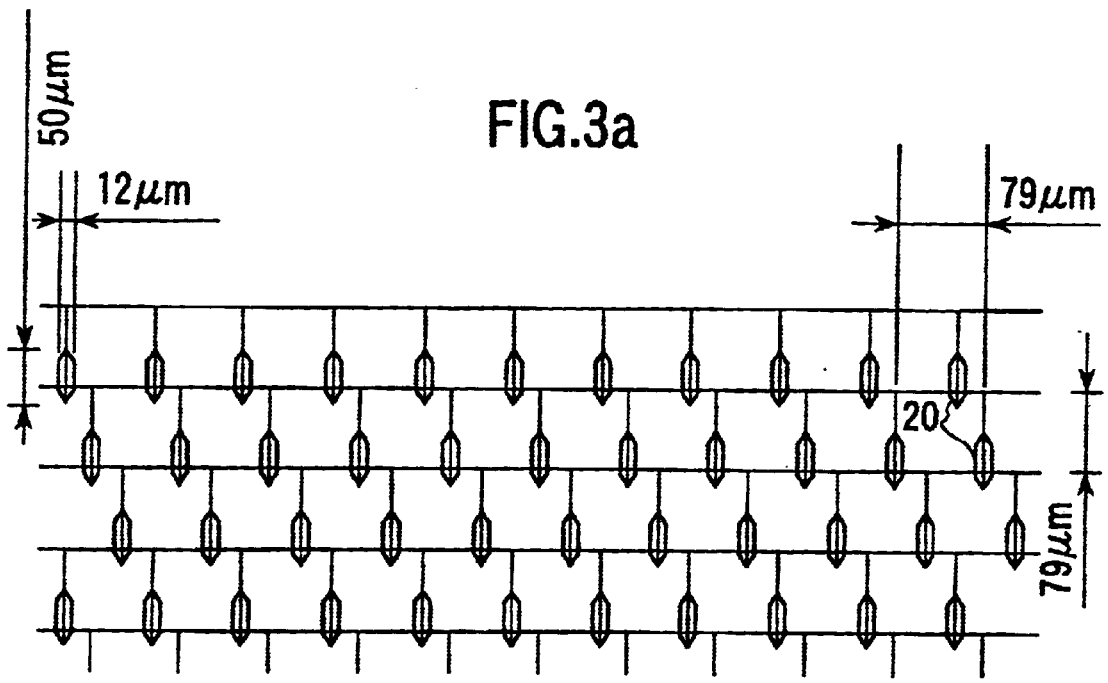
Figure 3B:
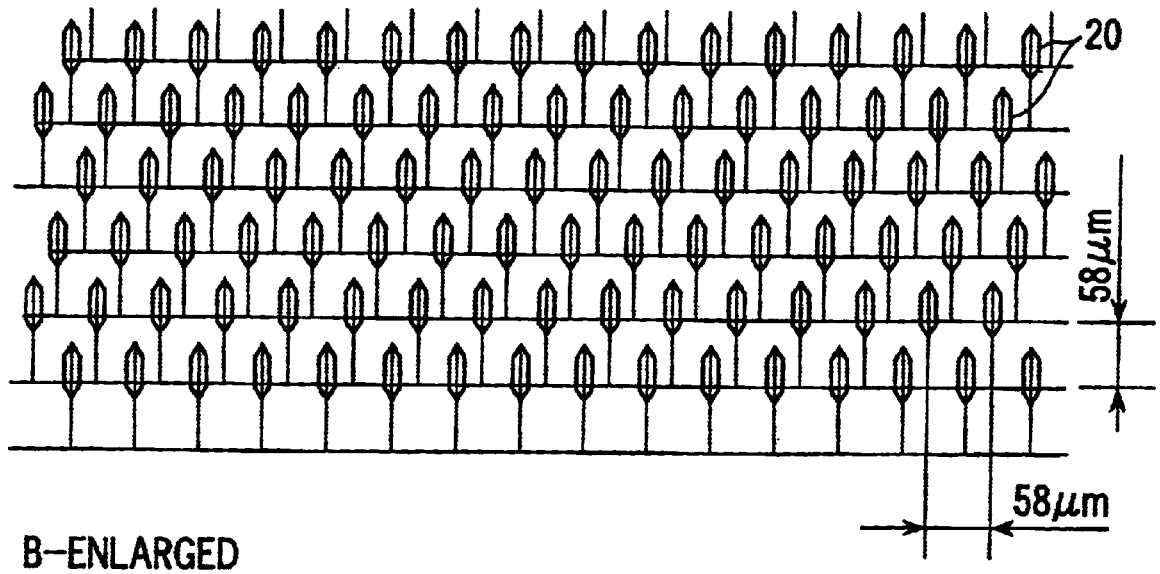

FIGS. 3a and 3b illustrate the arrangement of the projection 20 in the first embodiment, FIG. 3a being an enlarged illustration of a circled part A in FIG. 2a, and FIG. 3b being an illustration of projection arrangement in a circled part B in FIG. 2a. As shown in the figures, formation pitch is 79 $\mu$m in FIG. 3a and 58 $\mu$m in FIG. 3b.

This means that projections 20 are distributed with a relatively small density in area A relatively near to the incidence face 12 while they are distributed with a relatively large density in area B relatively far from the incidence face 12. Formation pitch tends to get smaller gradually according to increasing distance from the incidence face 12, although not shown, over the back face 14. In other words, formation density (covering rate) gets larger gradually according to increasing distance from the incidence face 12. This uniformalizes brightness over the emission face 13.

Figure 4:
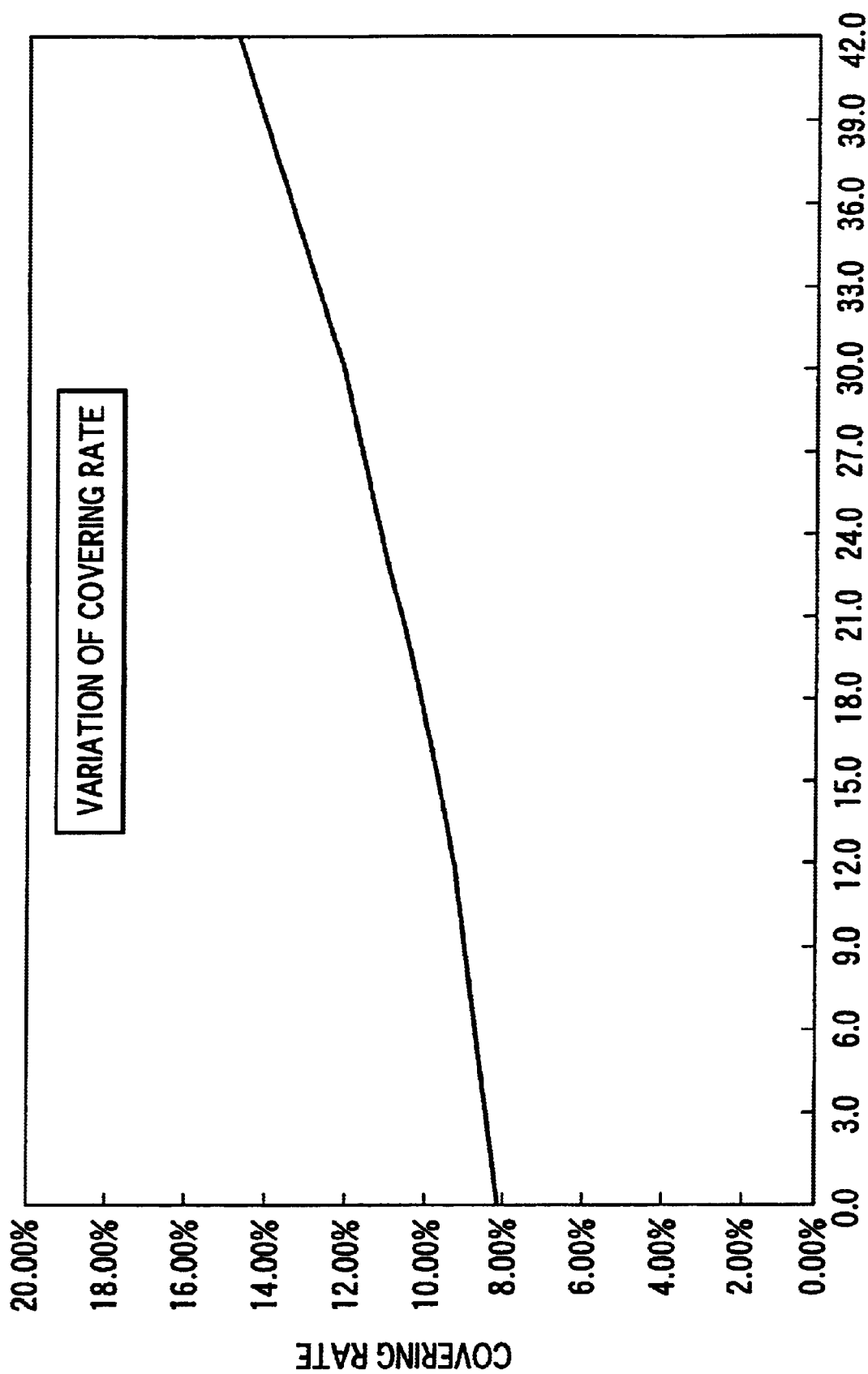
FIG. 4 is a graph illustrating variation of covering rate of projections in the first embodiment.

FIG. 4 is a graph illustrating an example of covering rate variation of projections 20. Abscissa is distance (mm) from incidence face 12 and ordinate is covering rate (%). Covering rate is defined as follows:

Covering rate=Cross section of projection cut along a general plane of the back face 14/(formation pitch)$^2$ Note that "general plane of the back face 14" is a plane on which the back face 14 extends provided that the projections are taken away.

Each projection 20 has a longitudinally extending shape. The longitudinal axis approximately aligns to a light coming direction. Size is designed so that individual projection is hardly visible. So to speak, the projections provide microreflectors. Seeing that size of individual projection corresponds to the lower limit of formation pitch, small size projections are preferable. Large formation pitch tends to bring a visible bright-dark pattern. Shown values (length:50 $\mu$m/width:12 $\mu$m) are merely examples.

It should be noted that projections 20 avoid from being aligned along a light coming direction (approximately vertical to incidence face 12) in order to give chances of direction conversion evenly. That is, it is preferable that the arrangement of projections 20 does not correspond to any precise two-dimension matrix. Such a manner of arrangement is also advantageous to make the projection arrangement as inconspicuous as possible.

Next, shape and direction conversion function of the projections are described. The following description can be also applied to projections employed in the other embodiments.

Figure 5A:
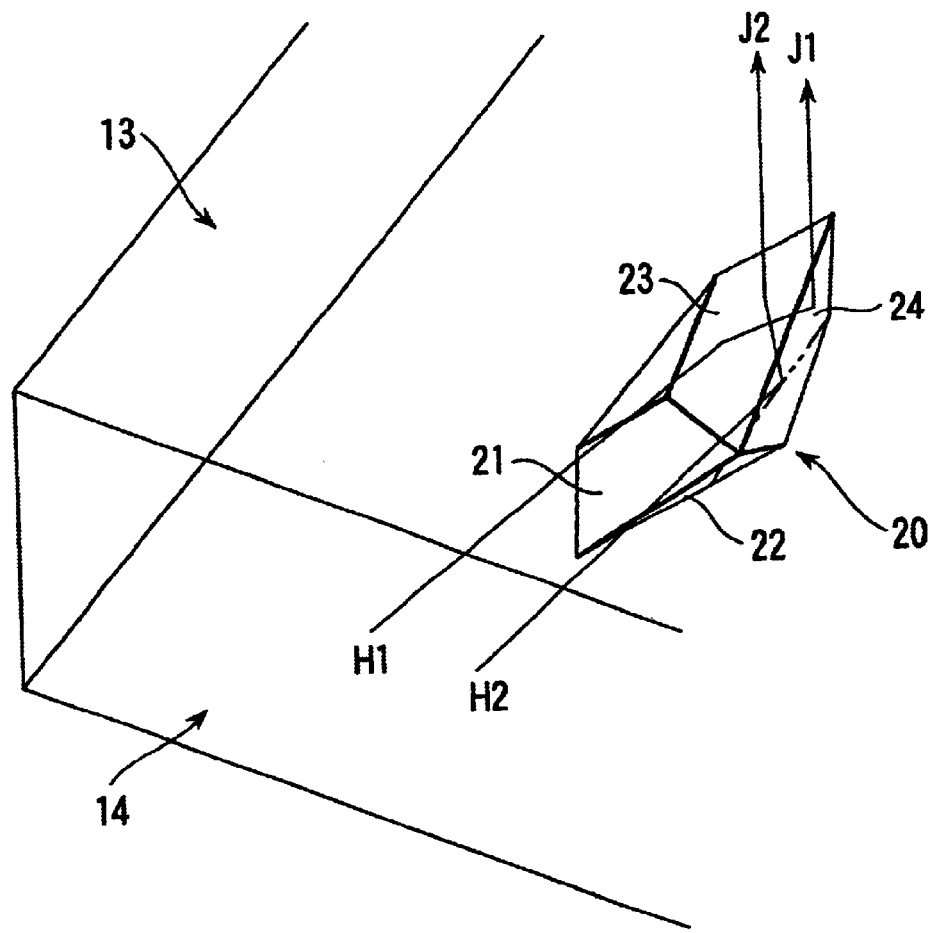
FIG. 5a is an enlarged perspective view showing the vicinity of a projection with an illustration of light paths of inner input light.
Figure 5B:
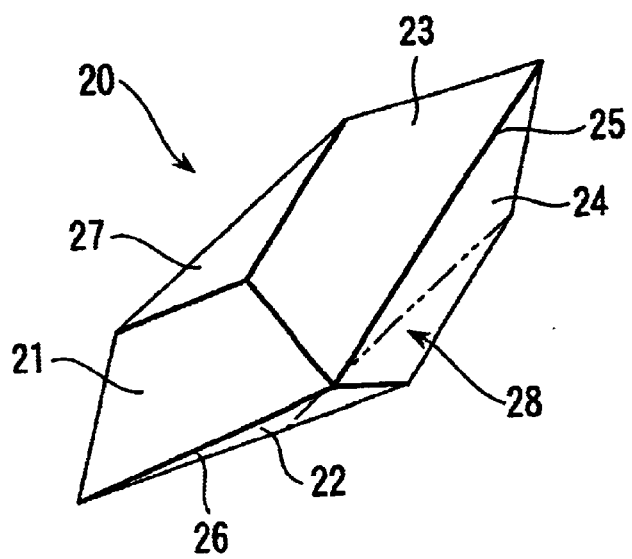
FIG. 5b is an enlarged perspective view showing a projection.

FIG. 5a is an enlarged perspective view showing the vicinity of a projection with an illustration of light paths of inner input light, and FIG. 5b is an enlarged perspective view showing a projection. Size is exaggerated for the sake of illustration.

As shown in FIGS. 5a and 5b, the projections 20 are configurated so that they project from the general plane of the back face 14 of the light guide plate 10. The projections 20 illustrated as examples are configurated like blocks each of which has six faces 21, 22, 23, 24, 27 and 28.

The faces 21 and 22 are slopes which provide a guide portion to effect smooth input for direction conversion. The faces 21 and 22 meet at a ridge 26. On the other hand, the faces 23 and 24 are slopes which provide reflection faces to effect twice-reflection for direction conversion, thereby generating inner output light. The faces 23 and 24 meet at a ridge 25. The faces 27 and 28 are side walls to limit width of the projection 20.

Orientation of the projections 20 is represented by the running directions of their ridges 25, respectively. In the present embodiment, the ridges 25, 26 gives a straight line "projectively onto the general plane of the back face 14".

Orientation of the projections 20 are preferably aligned to light coming directions. This roughly maximizes light input into the guide portion, accordingly roughly maximizing direction conversion efficiency, too.

Figure 1B:
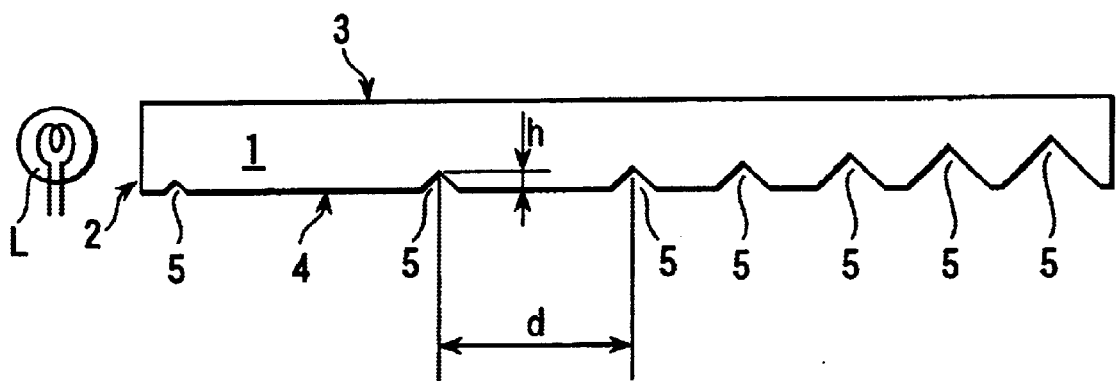
Figure 1C:
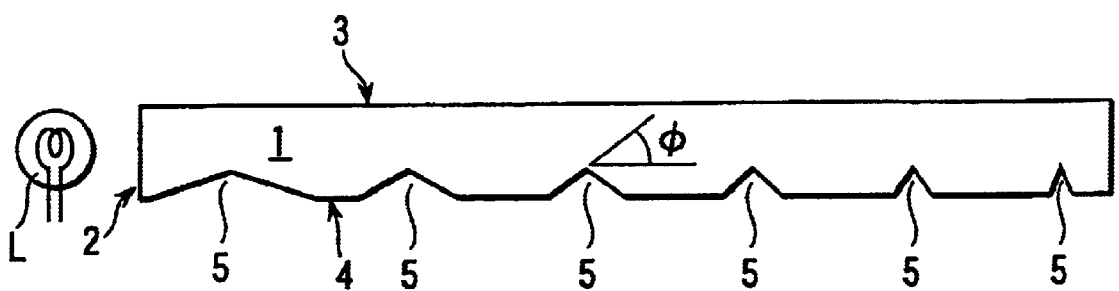

In the illustrated example, input light from light coming direction is represented by beams H1, H2. In the arrangement employing the primary light source L1, the beams H1, H2 are approximately perpendicular to the incidence face 12. However, light that is actually inputted into the projections is not precisely parallel to the general plane of the back face 14 but progresses somewhat downward (so as to approach the back face 14). Light that progresses precisely parallel to the general plane of the back face 14 or approaches the emission face 13 advances deep without being inputted to projections 20. Consequently, the projections 20 do not obstruct light advancing and give no region little light reaches, thereby effecting contrary to recesses (See FIG. 1).

Viewing from the standpoint of the beams H1, H2, the reflection faces 23, 24 of the conversion output portion configurate a valley. The ridge 25 corresponds to a bottom of the valley. The valley gets narrower and shallower according to distance from the guide portion. Therefore, light H1, H2 entering the valley via the guide portion is inner-reflected by one of the reflection faces 23, 24 generally without fail, and then inner-reflected again by the other faces 24 or 23. As a result, light propagation direction is converted twice in three dimensions to produce inner output light J1, J2 directed to the emission face 13.

Direction of inner output light J1, J2 can be controlled in a considerable range through adjusting directions (spatial directions) of the reflection faces 23, 24. If directions of the reflection faces 23, 24 are adjusted so that every projection 20 converts inner input H1, H2 from light coming direction into inner output light J1, J2 that is approximately parallel to a normal with respect to the emission face 13, emission like a parallel flux directed to a frontal direction is obtained over the emission face 13.

Alternatively, directions of the reflection faces 23, 24 and their orientation (i.e. running directions of the ridges 25) may be adjusted so that convergent emission directed to a certain point distant from the emission face 13 is produced. Direction of the reflection face 23 is not necessarily symmetric with that of the reflection face 24 with respect to the ridge 25. Such asymmetry expands direction controllability of output light flux.

Since the above-described direction conversion by the projections 20 is effected in three dimensions, direction control is possible regarding in both planes parallel and perpendicular to the incidence face 12. And, because direction conversion relies upon twice-reflection, a small angle of direction conversion is allowed per one reflection generally. Accordingly, incidence angles to the reflection faces 23, 24 are sufficiently greater than the critical angle in general, hardly causing light leaking.

It should be noted that input light contains light that impinges onto the sloped 21, 22 of the guide portion at a small incidence angle (near to 90 degrees with respect to the slopes) and is reflected toward the conversion output portion. Such light is also converted into inner output light which has propagation directions similar to J1, J2.

(2) Second Embodiment

Although the second embodiment has an outline similar to that of the first embodiment as shown in FIGS. 2a, 2b, the second embodiment employs another light guide plate different from one employed in the first embodiment. In the second embodiment, a light guide plate 30 as shown in FIG. 6 is adopted instead of the light guide plate 10. The light guide plate 30 is made of a transparent material such as acrylic resin or polycarbonate (PC), having a side end face to provide an incidence face 32.

A rod-like primary light source (cold cathode tube) L2 is disposed along the incidence face 32 which is supplied with light from the light source. It should be noted that the cold cathode tube L2 has a light emitting portion length of which is smaller a little than that of the incidence face 32. Both ends provide electrode portions EL1 and EL2 which are incapable of emitting light. Such a design is often employed in order to avoid the electrode portions EL1, EL2 from protruding.

A great number of projections 20 are formed on a back face 34. Arrangement and orientation of the projections 20 involves the following features.

1. Covering rate tends to increase according to distance from the incidence face 32. This prevents brightness on an emission face from varying depending on distance from the incidence face 32.

2. Projections 20 are arranged in corner areas C, D near to the electrode portions EL1, EL2 at a specially large density. This prevents, together with orientation of the following item 3, prevents dark areas corresponding to the areas C, D from emerging on the emission face.

3. Projections 20 are orientated so as to be approximately vertical to the incidence face 32 almost over the back face 34, with their guide portions being directed to the incidence face 32. In other words, each projection 20 is orientated so that its conversion output portion has a ridge 25 (see FIG. 5) which extends approximately at the right angle with respect to the incidence face 32.

4. In the corner areas C, D, projections 20 are obliquely orientated with respect to incidence face 32, with guide portions being directed to the light emitting portion of the cold cathode tube L2. This causes these projections 20 to be orientated corresponding to light coming directions, thereby rising direction conversion efficiency. And besides, directions of inner output light produced in the corner areas C, D can avoid from being greatly deviated from those of inner output light produced in other than the corner areas (See J1, J2 in FIG. 5).

5. In both side edge portions 35, 36 except the corner areas C, D, projections 20 are orientated so as to be inclined at small angles with respect to the incidence face 32, with guide portions being directed to the light emitting portion of the cold cathode tube L2. This causes these projections 20 to be orientated corresponding to light coming directions, as the above item 4, thereby rising direction conversion efficiency. And besides, directions of inner output light produced in the side edge portions can avoid from being greatly deviated from those of inner output light produced in other than the side edge portions (See J1, J2 in FIG. 5).

However, convergent emission can be alternatively obtained if conversion output portions (i.e. directions of inner-reflection faces 23, 24) of projections 20 arranged within a certain range from the side edges 35, 36 are designed so that inner output light is inclined toward a central portion of the light guide plate 30.

6. Projection arrangement does not have regularity such that many projections 20 align along a straight line. This makes the projections 20 more inconspicuous. And besides, if incorporated in a liquid crystal display, the projections can avoid from bringing Moire fringes which would be caused by an overlapping relation with a matrix-like electrode arrangement.

(3) Third Embodiment

Although the third embodiment has an outline similar to that of the first or second embodiment, the third embodiment employs another light guide plate different from ones employed in the first and second embodiments.

In the present embodiment, a light guide plate 40 as shown in FIG. 7 is adopted. The light guide plate 40 is made of a transparent material such as acrylic resin or polycarbonate (PC), having two side end faces to provide two incidence faces 42a, 42b.

Rod-like primary light sources (cold cathode tube) L3, L4 are disposed along the incidence faces 42a, 42b which are supplied with light from the light sources, respectively.

A great number of projections 20 are formed on a back face 44. Arrangement and orientation of the projections 20 involves the following features.

1. Covering rate and orientation of the projections 20 are designed as follows.

First, covering rate and orientation distribution (called Distribution 1) are designed so that brightness is uniform over an emission face under a provisional condition that only L3, one of the primary light sources, supplies light. Next, covering rate and orientation distribution (called Distribution 2) are designed so that brightness is uniform over an emission face under another provisional condition that only the other primary light source L4 supplies light.

Distribution 1 and Distribution 2 are piled up to determine a covering rate and orientation distribution (i.e. Distribution 1+Distribution 2) to be employed in the present embodiment.

Covering rate according to Distribution 1 tends to increase as distance from the incidence face 42a increases while that according to Distribution 2 increases as distance from the incidence face 42b increases.

Consequently, gradient of Distribution 1 tends to cancel that of Distribution 2 as a whole. In the illustrated example, a resultant covering rate is roughly constant.

The projections 20 are orientated so as to be aligned roughly vertical to the incidence faces 42a, 42b. It should be noted that guide portions of projections 20 set according to Distribution 1 are directed to the incidence face 42a while those of projections 20 set according to Distribution 2 are directed to the incidence face 42b. Usually, the primary light sources L3 and L4 have an equal power, and half of the whole projections 20 are directed to the incidence face 42a, the other being directed to the incidence face 42b.

2. As in the case of the embodiment 1, projection arrangement does not have regularity such that many projections 20 align along a straight line. This makes the projections 20 more inconspicuous. And besides, if incorporated in a liquid crystal display, the projections can avoid from bringing Moire fringes which would be caused by an overlapping relation with a matrix-like electrode arrangement.

(4) Fourth Embodiment

Although the fourth embodiment has an outline similar to that of the first, second or third embodiment, the fourth embodiment employs a different light guide plate and primary light source.

In the present embodiment, a light guide plate 50 and primary light source L5 as shown in FIG. 8 are adopted. The light guide plate 50 is made of a transparent material such as acrylic resin or polycarbonate (PC), comprising a side end face 52 having a recess 52a to provide an incidence face at a central portion of the side end face 52.

The primary light source L5 is a point-like light source, for instance, provided with LED (Light Emitting Diode) and is arranged so that the light guide plate 50 is supplied with light through the recess 52a.

A great number of projections 20 are formed on a back face 54. Arrangement and orientation of the projections 20 involves the following features.

1. Covering rate

1. Covering rate tends to increase according to distance from the recess 52a. This prevents brightness on an emission face from varying depending on distance from the recess 52 (or the point-like light source L5).

2. Projections 20 are orientated radially with respect to the recess 52a over the back face 54. Guide portions are directed to the recess 52a. In other words, each projection 20 is orientated so that its conversion output portion has a ridge 25 (see FIG. 5) which runs toward the recess 52a.

3. If the point-light source L5 has emitting characteristics with directivity to a frontal direction, covering rate of projection 20 may be set large around the side end faces 52. In particular, it is preferable to set a great covering rate in corner areas E and F.

4. Projection arrangement does not have regularity such that many projections 20 align along a straight line. This makes the projections 20 more inconspicuous. And besides, if incorporated in a liquid crystal display, the projections can avoid from bringing Moire fringes which would be caused by an overlapping relation with a matrix-like electrode arrangement.

(5) Fifth Embodiment

Although the fifth embodiment has an outline similar to that of the above-described embodiments, in particular, that of the fourth embodiment, the fifth embodiment employs a different light guide plate and primary light sources.

In the present embodiment, a light guide plate 60 and two primary light sources L6 and L7 as shown in FIG. 9 are adopted.

The light guide plate 60 is made of a transparent material such as acrylic resin or polycarbonate (PC), comprising a side end face 62 having recesses 62a and 62b to provide incidence faces.

The primary light sources L6 and L7 re point-like light sources, for instance, provided with LED (Light Emitting Diode) and is arranged so that the light guide plate 60 is supplied with light through the recesses 62a and 62b, respectively.

A great number of projections 20 are formed on a back face 64. Arrangement and orientation of the projections 20 involves the following features.

1. Covering rate and orientation of the projections 20 are designed, in view of positions in relation to the recesses 62a and 62b, so that brightness variation does not appear on an emission face.

First, covering rate and orientation distribution (called Distribution 3) are designed so that brightness is uniform over an emission face under a provisional condition that only L6, one of the primary light sources, supplies light. Next, covering rate and orientation distribution (called Distribution 4) are designed so that brightness is uniform over an emission face under another provisional condition that only the other primary light source L7 supplies light.

Distribution 3 and Distribution 4 are piled up to determine a covering rate and orientation distribution (i.e. Distribution 3+Distribution 4) to be employed in the present embodiment.

Covering rate according to Distribution 3 tends to increase as distance from the primary light source L6 increases while that according to Distribution 4 increases as distance from the primary light source L7 increases.

Consequently, gradient of Distribution 3 tends to cancel that of Distribution 4 as a whole. In the illustrated example, a resultant covering rate is roughly constant.

Half of the whole projections 20 are arranged radially with respect to the recess 62a according to Distribution 3 while the other are arranged radially with respect to the recess 62b according to Distribution 4. Guide portions of the former are directed to the recess 62a while those of the latter are directed to the recess 62b.

2. Projection arrangement does not have regularity such that many projections 20 align along a straight line. This makes the projections 20 more inconspicuous. And besides, if incorporated in a liquid crystal display, the projections can avoid from bringing Moire fringes which would be caused by an overlapping relation with a matrix-like electrode arrangement.

(6) Sixth Embodiment

Figure 10:
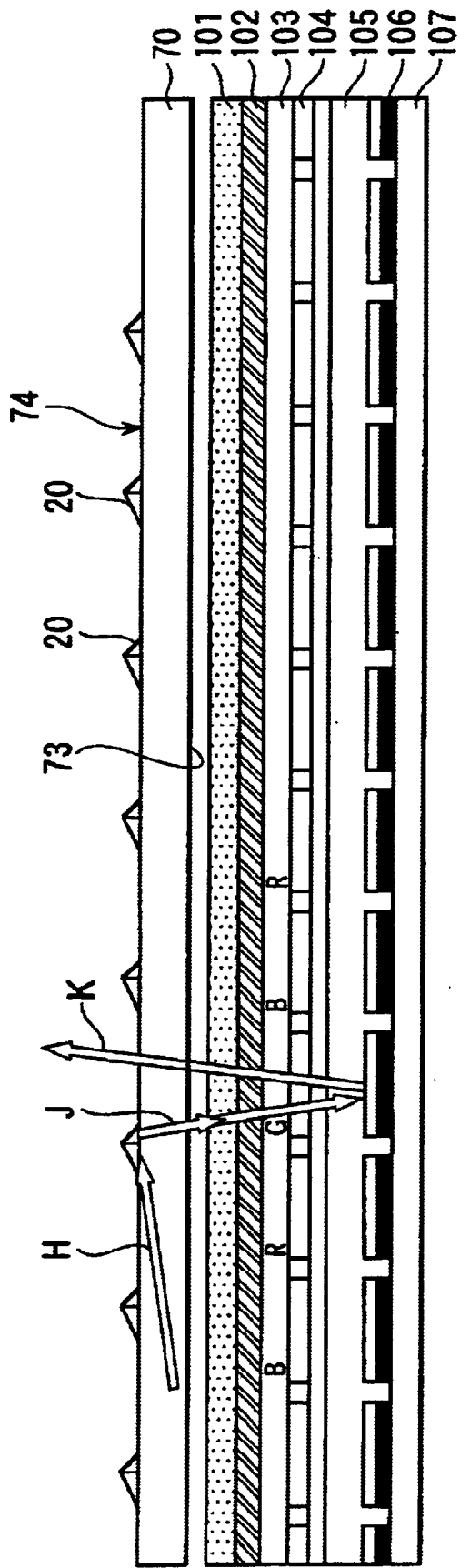
FIG. 10 is a cross section view to illustrate a sixth embodiment where a surface light source device in accordance with the present invention is applied to a front lighting arrangement in a front-lighting-type liquid crystal display.

The present invention may be applied to front-lighting for a liquid crystal display of front-lighting-type, as shown in FIG. 10. This is described as the sixth embodiment.

A light guide plate 70 of a surface light source device used for front-lighting is arrange in the front of a liquid crystal display panel (i.e. on the viewing side). The liquid crystal display panel is composed of a scattering film (light diffusing sheet) 101, polarization plate 102, first glass substrate 103, color filter 104, liquid crystal cell 105, mirror surface reflection electrode 106, and a second glass substrate 107. The color filter 104 has three primary color regions R, G and B. Such structure and operation of the liquid crystal display panel are known well and detailed description is omitted.

The light guide plate 70 and a primary light source (not shown) may be arranged in a manner as adopted in any of the first through fifth embodiments. The light guide plate 70 employed for front-lighting is disposed so that an emission face 73 just faces the liquid crystal display panel. As indicated with references H, J, K, when light H propagating in the light guide plate 70 is inputted into the a projection 20, double inner reflections as aforesaid follows to convert the inputted light into inner output J. Inner output J is emitted through the emission face 73 in a generally frontal direction, being incident to the liquid crystal display panel.

The mirror surface reflection electrode 106 reflects inner output light J reaching the electrode via the scattering film (light diffusing sheet) 101, polarization plate 102, first glass substrate 103, color filter 104 and liquid crystal cell 105. This reflected light comes to the polarization plate 102 again via the liquid crystal cell 105, color filter 104 and the first glass substrate 103. The polarization plate 102 effects transmitting or blocking for each pixel depending on ON/OFF—state of the corresponding mirror surface reflection electrode 106 (i.e. depending on polarization state).

If the mirror surface reflection electrode 106 allow the reflected light to transmits through the polarization plate 102, the light is emitted from a back face 74 as displaying light K after passing through the scattering film (light diffusion sheet) 101 and the light guide plate 70. It should be noted that light encountering any projection 20 on the back face 74 is reflected in a manner like retro-reflection to be directed again to the liquid crystal display panel and leads to no useless consumption.

Figure 11:
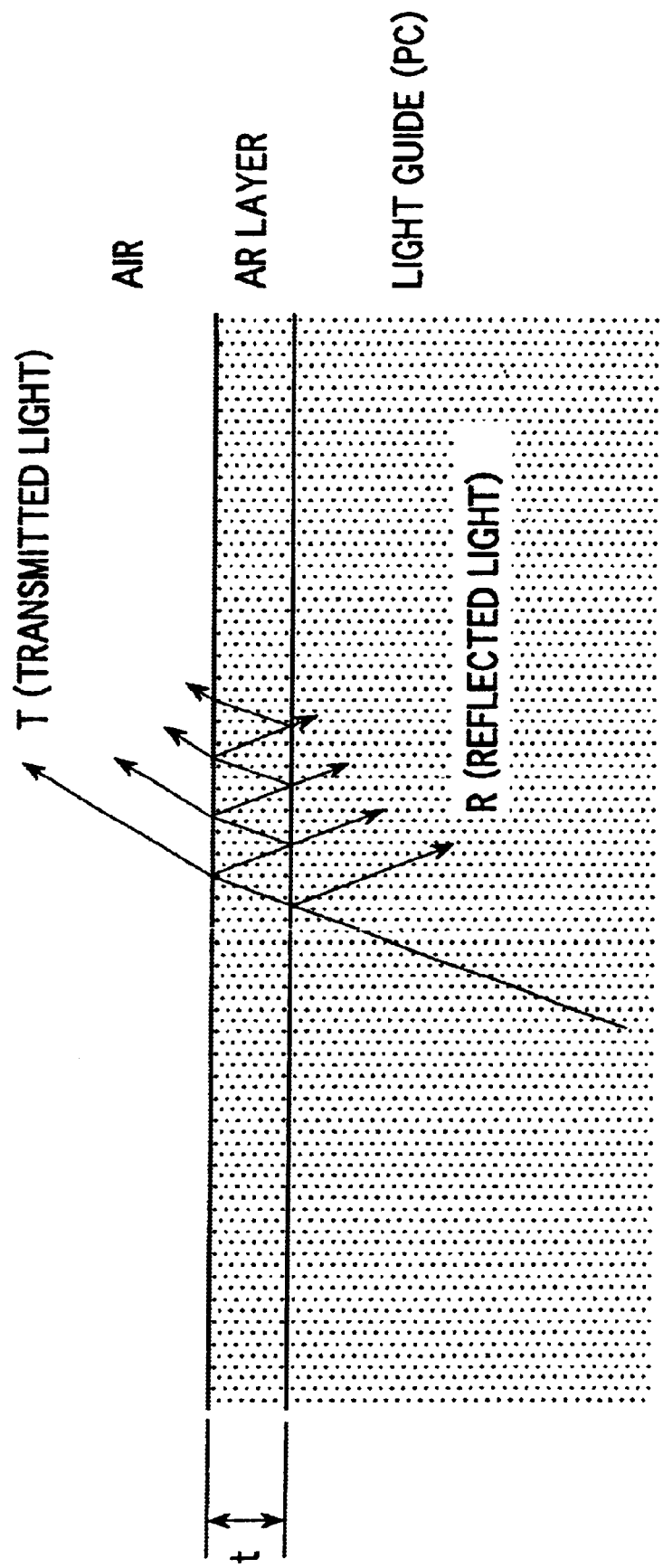
FIG. 11 illustrates an effect of an antireflection film.

It is preferable to apply an antireflection layer to the emission faces of the light guide plates employed in the above-described embodiments, in particular in the sixth embodiment. FIG. 11 is a cross section view to illustrate an example of an antireflection layer applied to an emission face of a light guide plate. The antireflection layer AR is, for example, made of $MgF_2$ (refractive index=1.38), having a thickness of t=99.6 $\mu$m. The light guide plate is made of polycarbonate (PC;refractive index=1.58).

Some of the light inner-incident to the emission face is reflected at PC-$MgF_2$ interface and $MgF_2$-air interface, with some of the other being transmitted. As known well, if relation among factors such as thickness and refractive index of the antireflection layer AR, and wavelength and incidence angle is such that transmitting light T is enforced by virtue of interference and reflection light R is weaken by virtue of interference, the anti reflection layer AR demonstrates its antireflection function.

Figure 12:
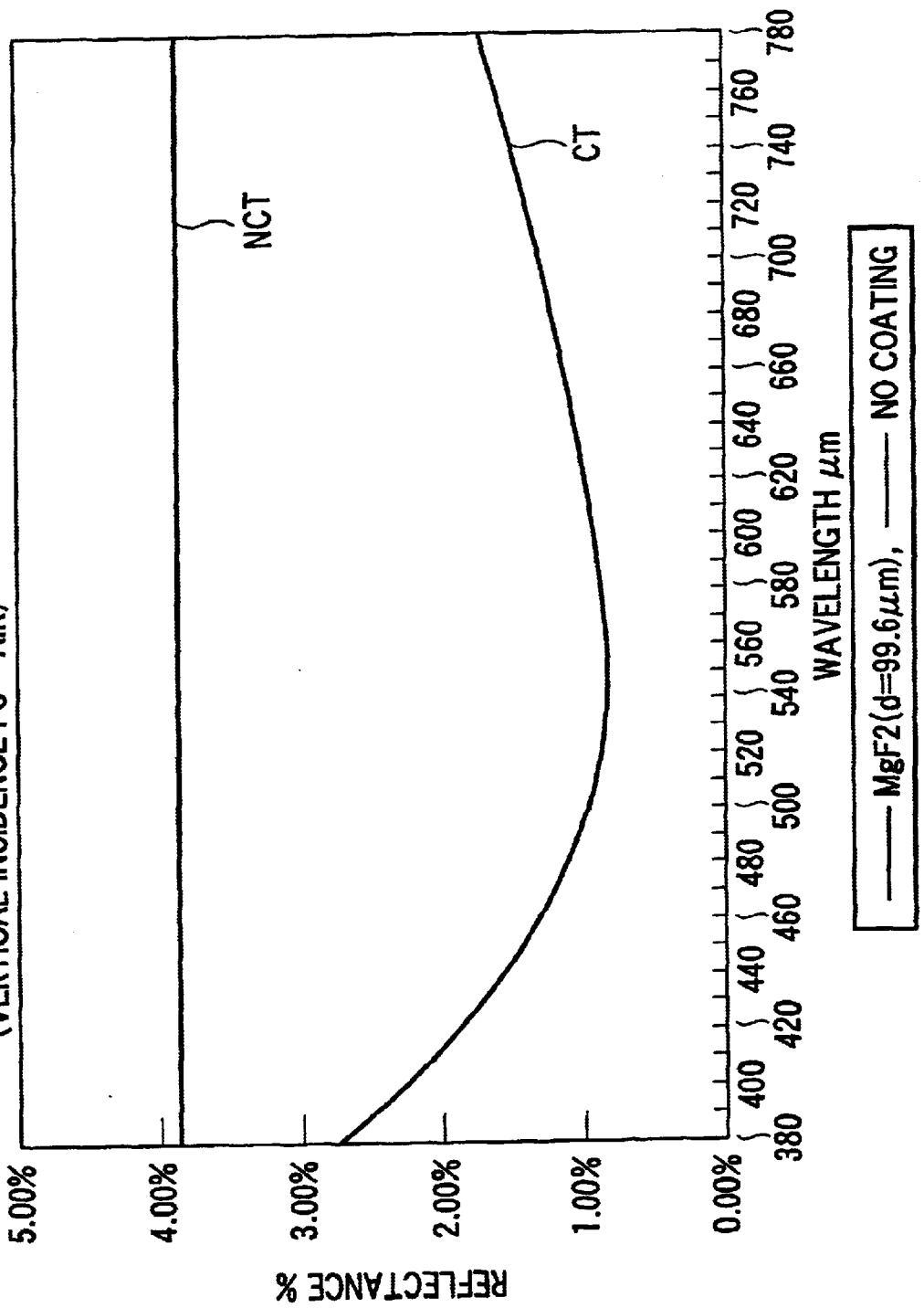
FIG. 12 is a graph illustrating exemplarily characteristics of an antireflection film.

FIG. 12 is a graph illustrating reflection coefficient (100%—emission coefficient) of vertical incidence light as a function of wavelength under the above conditions, with an illustration of a case where no antireflection layer is applied. As understood from the graph, reflection coefficient keeps approximately a constant value, 3.8% in the case of no antireflection layer (NCT). To the contrary, if the above antireflection layer is applied (CT), reflection coefficient falls into a low-value range from 1% to 2% for light within a wavelength region from 400 $\mu$m to 780 $\mu$m.

Accordingly, if such a antireflection layer is applied to the emission faces of the light guide plates employed in the embodiments, in particular in the sixth embodiments, the emission faces provide smooth emission with reduction of noise which is originated from reflection.

(7) Seventh Embodiment

According to description of the above embodiments, inner input light to each projection 20 is inner-outputted toward an emission face after travelling via a guide portion and direction conversion portion. However, in cases where light is introduced from directions (first and second directions) opposite to each other, as shown in FIG. 7 (the third embodiment), some light is inputted to a direction conversion portion and directed to the emission face by virtue of being reflected twice in a guide portion.

It should be noted that guide portions are required to be configured like valleys similar to direction conversion portions so that double reflections in the guide portions are performed. It is needless to say that the third embodiment satisfies the above requirement.

However, input light coming from opposite directions are differently direction-converted because each projection 20 in the third embodiment has a valley (first valley), which is formed in a direction conversion portion, and another valley (second valley), which is formed in a guide portion and is different from the first valley in size and configuration.

According to an improvement of the seventh embodiment, the second valley formed in a guide portion are approximately the same as the first valley formed in a direction conversion portion both in size and configuration.

Figure 13:
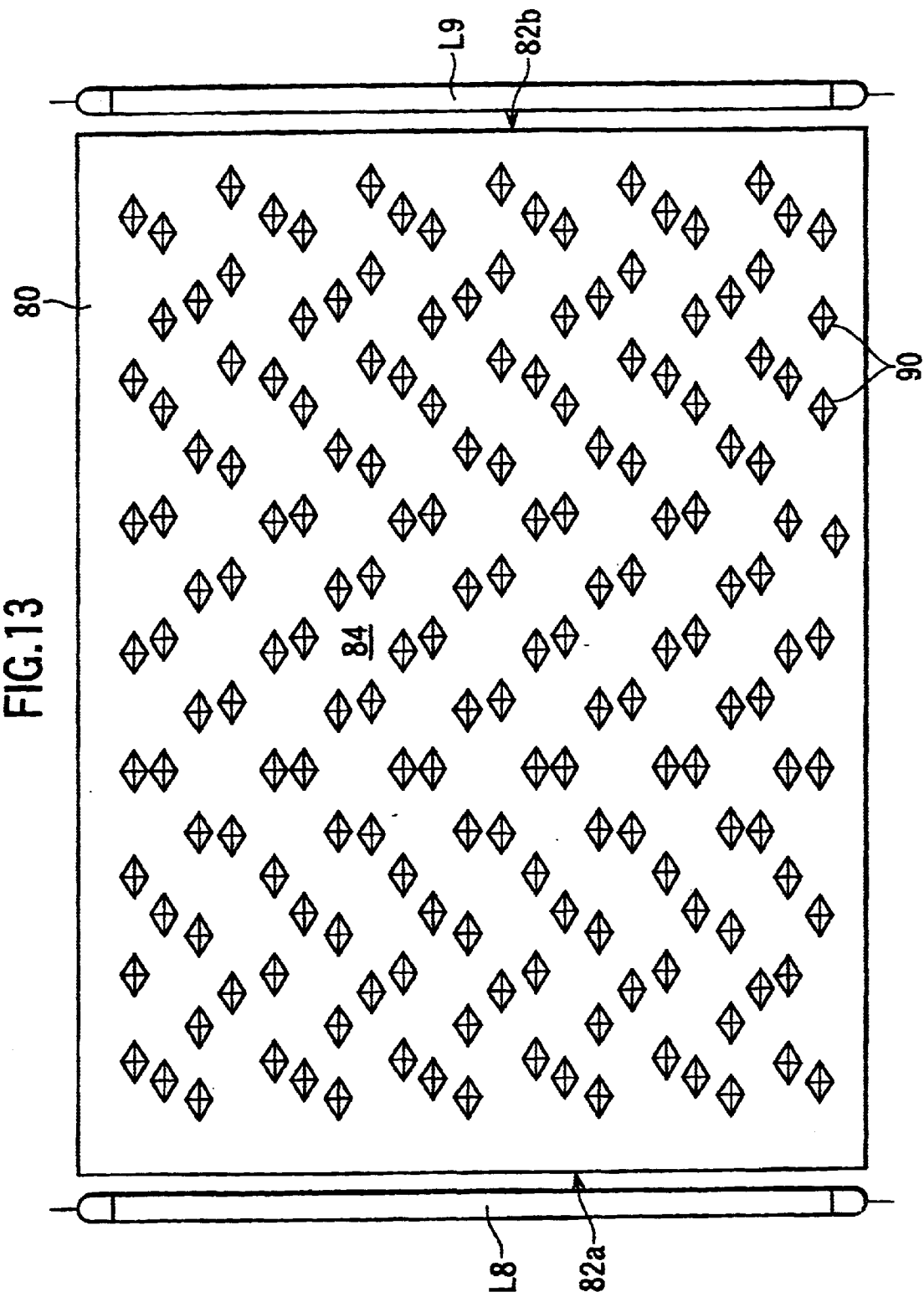
FIG. 13 is a plan view to illustrate projection arrangement in a seventh embodiment in accordance with the present invention; and, FIG. 14 is an enlarged perspective view showing the vicinity of a projection employed in the seventh embodiment with an illustration of light paths of inner input light.

FIG. 13 illustrates projection arrangement in the seventh embodiment. Referring to FIG. 13, the present embodiment employs the same arrangement as that of the third embodiment except that projections (i.e. microreflectors) are configurated differently.

Figure 14:
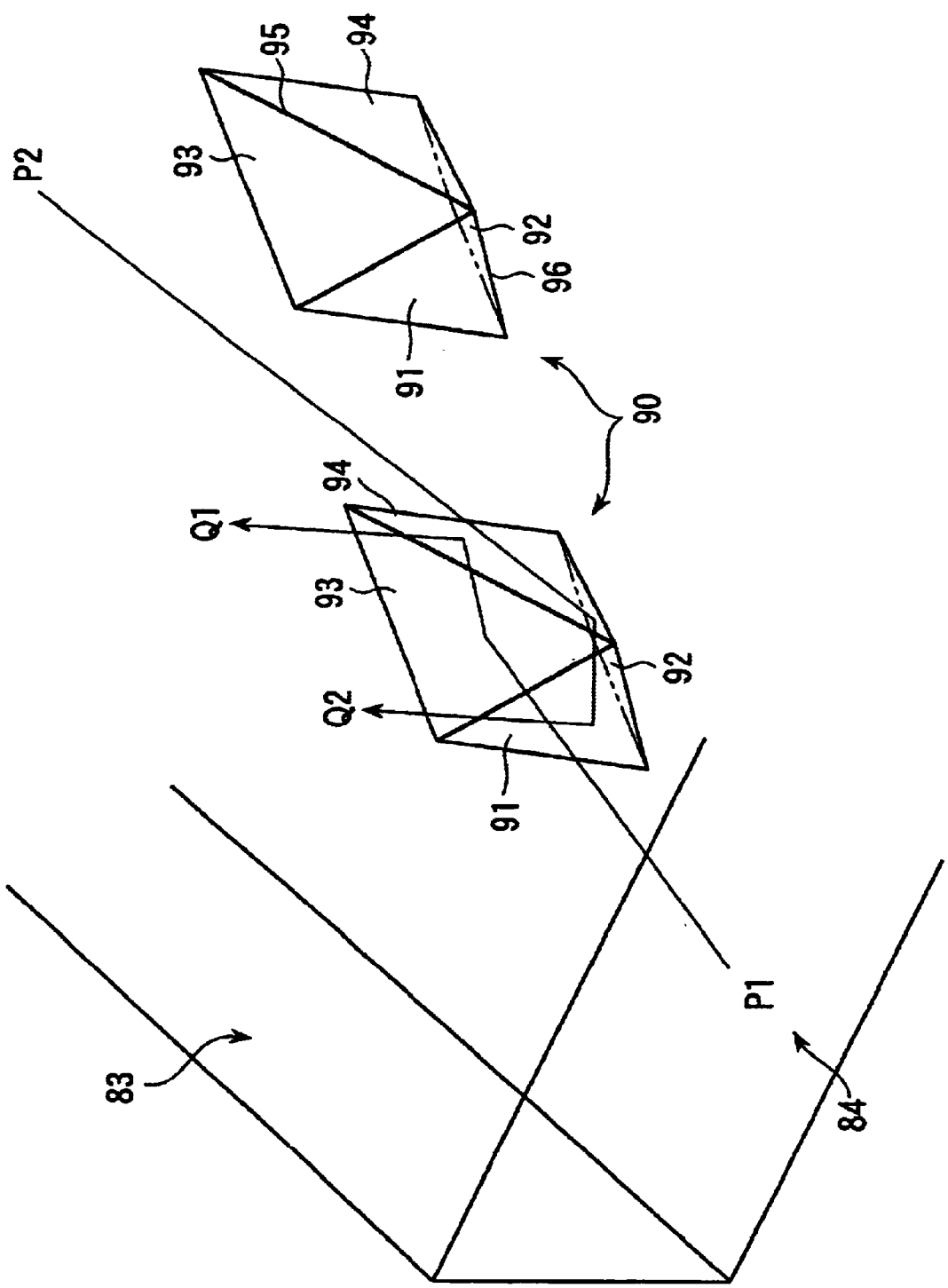

FIG. 14 is an enlarged perspective view showing the vicinity of a projection employed in the seventh embodiment with an illustration of light paths of inner input light.

A light guide plate 80 is made of a transparent material such as acrylic resin or polycarbonate (PC), having two side end faces to provide two incidence faces 82a, 82b.

Rod-like primary light sources (cold cathode tube) L8, L9 are disposed along the incidence faces 82a, 82b which are supplied with light from the light sources, respectively.

A great number of projections 90 are formed on a back face 84.

Each projection 90 has a shape different from that of each projection 20 and performs direction conversion in a manner different from that of each projection 20. FIG. 14 is an enlarged perspective view showing the vicinity of a projection 90. Size of the projection 90 is exaggerated for the sake of illustration.

Each projection 90 is configured so that it projects from a general plane of the back face 84 of the light guide plate 80. Two projections 90 illustrated as examples are configurated like blocks each of which has four inner-reflection slopes 91, 92, 93 and 94.

In this example, since the primary light sources are arranged as shown in FIG. 13, beams P1, P2 representing input light come from directions opposite to each other (i.e. with a direction difference of approximately 180 degrees).

The slopes 91, 92 not only provide the beam P1 with a guide portion to get light input smoothly for direction conversion but also provide the beam P2 with a direction conversion output portion. The slopes 93, 94 provide the beam P1 with a direction conversion output portion while providing the beam P2 with a guide portion.

The slopes 93, 94 meet at a ridge (first ridge) 95 to configurate a first valley. On the other hand, the slopes 91, 92 meet at another ridge (second ridge) 96 to configurate a second valley. Viewing from the standpoint of inner propagation light, the ridges 95 and 96 give the bottom of the valleys.

Orientation of the projections 90 is represented by the running directions of the ridges 95, 96. In the present embodiment, the ridges 95, 96 give a straight line "projectively onto the general plane of the back face 84". Orientation of the projections 90 are preferably parallel (0 degree or 180 degrees) with a two light coming directions. This roughly maximizes light input into the projections 90, accordingly also roughly maximizing direction conversion efficiency, too.

It should be noted that light that is actually inputted into the projections 90 is not precisely parallel to the general plane of the back face 84 but progresses somewhat downward (so as to approach the back face 84) also in the present embodiment. Light that progresses precisely parallel to the general plane of the back face 84 or approaches the emission face 83 advances deep without being inputted to projections 90. Consequently, the projections 90 do not obstruct light advancing and give no region little light reaches.

The first valley gets narrower and shallower according to distance from the slopes 91, 92. On the other hand, the second valley gets narrower and shallower according to distance from the slopes 93, 94.

Therefore, input each of light P1, P2 is inner-reflected twice either by the reflection faces 93, 94 or by the reflection faces 91, 92, generally without fail. As a result, propagation direction conversion occurs twice three-dimensionally, producing inner output light Q1, Q2 directed to the emission face 83.

Direction of inner output light Q1, Q2 can be controlled in a considerable range through adjusting directions (spatial directions) of the reflection faces 91 through 94. If directions of these reflection faces are adjusted so that every projection 90 provides inner output light Q1, Q2 directed approximately in parallel with a normal with respect to the emission face 93, emission like a parallel flux directed to a frontal direction is obtained over the emission face 83.

Since such direction conversion by virtue of the projections 90 is effected three-dimensionally, direction control is possible regarding in not only a plane perpendicular to the incidence faces 82a, 82b but also in another plane parallel with the incidence faces 82a, 82b.

It should be noted that arrangement and orientation of the projections (i.e. running direction of the ridges 95, 96) are generally the same as those of the third embodiment, and accordingly details are omitted.

As described throughout the specification, according to the present invention, direction conversion is effectively achieved within a light guide plate through twice-inner-reflection caused by projections distributed on a back face of the light guide plate. Direction of inner output light which is involved by the above direction conversion is controllable depending on directions of reflection faces of output portions of the projections.

Accordingly, emission toward useless directions can be avoided, contrasted with direction conversion relying upon scattering or diffusing. And emission toward a frontal direction or a direction around the frontal direction is achieved without employing a prism sheet. Further, applicability to front-lighting-type liquid crystal displays is superior as well as to back-lighting-type liquid crystal displays.

What is claimed is:

1. A light guide plate comprising:

two major faces to provide an emission face and a back face; and a side end face to introduce light, wherein said back face is provided with a great number of projections for conversion of light propagation direction and each of the projections includes a guide portion and a conversion output portion including a ridge on both sides of which a first reflection face and a second reflection face are formed, said ridge, said first reflection face and said second reflection face configurating a valley within each of the projections, the valley getting narrower and shallower according to distance from the guide portion, thereby causing inner input light reaching the valley to be reflected by one of said first and second reflection faces and then reflected by the other reflection face so that inner output light directed to said emission face can be generated, a running direction of said ridge varying depending on a position on said back face so that said valley is faces an incoming direction of main light.

2. A surface light source device comprising:

at least one primary light source; and a light guide plate having two major faces to provide an emission face and a back face and having a side end face to introduce light, wherein said back face is provided with a great number of projections for conversion of light propagation direction and each of the projections includes a guide portion and a conversion output portion including a first ridge on both sides of which a first reflection face and a second reflection face are formed, said first ridge, said first reflection face and said second reflection face configurating a first valley within each of the projections, the first valley getting narrower and shallower according to distance from the guide portion, thereby causing inner light reaching said first valley to be reflected by one of said first and second reflection faces and then reflected by the other reflection face so that inner output light directed to said emission face can be generated, a running direction of said first ridge varying depending on a position on said back face so that said first valley faces an incoming direction of main light.

3. A surface light source device as defined in claim 2, wherein light introduction is done from a first direction and a second direction opposite to said first direction, and light introduced from said first direction gives inner input light which reaches said first valley via said guide portion to be reflected by one of said first and second reflection faces and then by the other reflection face so that inner output light directed to said emission face can be generated, and, said guide portion includes a second ridge on both sides of which a third reflection face and a fourth reflection face are formed, said second ridge, said third reflection face and said fourth reflection face configurating a second valley within each of the projections, the second valley getting narrower and shallower according to distance from said conversion output portion so that said guide portion and said conversion output portion exchange their functions to each other for light which is introduced from the second direction, thereby causing inner input light reaching said second valley via said conversion output portion after being introduced from the second direction to be reflected by one of said third and fourth reflection faces and then by the other reflection face so that inner output light directed to said emission face can be generated, the running direction of said first ridge or a running direction of said second ridge varying depending on a position on said back face so that at least one of said first valley and said second valley faces an incoming direction of main light.

4. A surface light source device as defined in claim 3, wherein said first valley and said second valley are approximately the same dimension and approximately the same configuration.

5. A liquid crystal display of back-lighting-type provided with a surface light source device for back-lighting a liquid crystal display panel, the surface light source comprising:

at least one primary light source; and a light guide plate having two major faces to provide an emission face and a back face and having a side end face to introduce light, wherein said back face is provided with a great number of projections for conversion of light propagation direction and each of the projections includes a guide portion and a conversion output portion including a first ridge on both sides of which a first reflection face and a second reflection face are formed, said first ridge, said first reflection face and said second reflection face configurating a first valley within each of the projections, the first valley getting narrower and shallower according to distance from the guide portion, thereby causing inner input light reaching said first valley to be reflected by one of said first and second reflection faces and then reflected by the other reflection face so that inner output light directed to said emission face can be generated, a running direction of said first ridge varying depending on a position on said back face so that said first valley faces an incoming direction of main light.

6. A liquid crystal display as defined in claim 5, wherein light introduction is done from a first direction and a second direction opposite to said first direction, and light introduced from said first direction gives inner input light which reaches said first valley via said guide portion to be reflected by one of said first and second reflection faces and then by the other reflection face so that inner output light directed to said emission face can be generated, and said guide portion includes a second ridge on both sides of which a third reflection face and a fourth reflection face are formed, said second ridge, said third reflection face and said fourth reflection face configurating a second valley within each of the projections, the second valley getting narrower and shallower according to distance from said conversion output portion so that said guide portion and said conversion output portion exchange their functions to each other for light which is introduced from the second direction, thereby causing inner input light reaching said second valley via said conversion output portion after being introduced from the second direction to be reflected by one of said third and fourth reflection faces and then by the other reflection face so that inner output light directed to said emission face can be generated, a running direction of at least one of said first ridge and said second ridge varying depending on a position on said back face so that at least one of said first valley and said second valley faces the incoming direction of main light.

7. A liquid crystal display as defined in claim 6, wherein said first valley and said second valley are approximately the same dimension and approximately the same configuration.

8. A liquid crystal display of front-lighting-type provided with a surface light source device for front-lighting a liquid crystal display panel, the surface light source comprising:

at least one primary light source; and a light guide plate having two major faces to provide an emission face and a back face and having a side end face to introduce light, wherein said back face is provided with a great number of projections for conversion of light propagation direction and each of the projections includes a guide portion and a conversion output portion including a first ridge on both sides of which a first reflection face and a second reflection face are formed, said first ridge, said first reflection face and said second reflection face configurating a first valley within each of the projections, the first valley getting narrower and shallower according to distance from the guide portion, thereby causing inner input light reaching said first valley to be reflected by one of said first and second reflection faces and then reflected by the other reflection face so that inner output light directed to said emission face can be generated.

9. A liquid crystal display as defined in claim 8, wherein a running direction of said first ridge varies depending on a position on said back face so that said first valley faces an incoming direction of main light.

* * * * *